US 012000745B2

(12) United States Patent
Vignolles et al.

(10) Patent No.: US 12,000,745 B2
(45) Date of Patent: Jun. 4, 2024

(54) TORQUE SENSOR DEVICE

(71) Applicant: MEAS France, Toulouse (FR)

(72) Inventors: Arthur Vignolles, Les Clayes-sous-Bois (FR); Jean-Pierre LeClair, Les Clayes-sous-Bois (FR)

(73) Assignee: MEAS France, Toulouse (FR)

(*) Notice: Subject to any disclaimer, the term of this patent is extended or adjusted under 35 U.S.C. 154(b) by 162 days.

(21) Appl. No.: 17/231,500

(22) Filed: Apr. 15, 2021

(65) Prior Publication Data
US 2021/0325267 A1 Oct. 21, 2021

(30) Foreign Application Priority Data
Apr. 16, 2020 (EP) .................................... 20315179

(51) Int. Cl.
G01L 3/10 (2006.01)
B25J 13/08 (2006.01)
B25J 17/02 (2006.01)

(52) U.S. Cl.
CPC ............. *G01L 3/108* (2013.01); *B25J 13/085* (2013.01); *B25J 17/0241* (2013.01)

(58) Field of Classification Search
CPC ..... G01L 3/108; G01L 1/2231; G01L 5/0042; B25J 13/085; B25J 17/0241
See application file for complete search history.

(56) References Cited

U.S. PATENT DOCUMENTS

| 2,011,401 | A | * | 8/1935 | Fawick | F16D 41/088 |
| | | | | | 475/287 |
| 9,003,896 | B2 | * | 4/2015 | Nold | G01L 3/1457 |
| | | | | | 73/862.321 |
| 10,830,654 | B2 | * | 11/2020 | Wang | G01L 3/08 |
| 2018/0215054 | A1 | * | 8/2018 | Brudniok | B25J 19/063 |
| 2022/0244117 | A1 | * | 8/2022 | Zhao | B25J 13/085 |

FOREIGN PATENT DOCUMENTS

| CN | 107664549 | A | * | 2/2018 | ............ G01L 3/04 |
| DE | 10317304 | A1 | * | 12/2003 | ......... G01L 3/1457 |
| DE | 102016012324 | A1 | * | 4/2018 | ......... B25J 13/085 |
| EP | 964191 | A2 | * | 12/1999 | ....... B29C 45/14311 |
| EP | 2322905 | A1 | * | 5/2011 | ............ B29C 45/76 |
| EP | 2322905 | A1 | | 5/2011 | |
| EP | 2395335 | A1 | * | 12/2011 | ......... G01L 3/1457 |
| JP | 2000009231 | A | * | 1/2000 | ....... B29C 45/14311 |
| WO | 2018041948 | A1 | | 3/2018 | |
| WO | WO-2018146917 | A1 | * | 8/2018 | ......... B25J 13/085 |

OTHER PUBLICATIONS

European Patent Office Communication, Application No. 20 315 179.0-1001, dated Jun. 23, 2023, 5 pages.

* cited by examiner

*Primary Examiner* — Octavia Davis Hollington
(74) *Attorney, Agent, or Firm* — Barley Snyder

(57) ABSTRACT

A torque sensor device includes a circular body having an annular inner flange, an annular outer flange, and a circular intermediate portion between the annular inner flange and the annular outer flange. The annular inner flange is closer to a center of the circular body than the annular outer flange. The circular intermediate portion is a continuously solid portion.

19 Claims, 4 Drawing Sheets

TORQUE SENSOR DEVICE

CROSS-REFERENCE TO RELATED APPLICATIONS

This application claims the benefit of the filing date under 35 U.S.C. § 119(a)-(d) of European Patent Application No. 20315179, filed on Apr. 16, 2020.

FIELD OF THE INVENTION

The present invention relates to a sensor device and, more particularly, to a torque sensor device for determining a torque of an object.

BACKGROUND

Accurately detecting the torque of an object, such as a driven shaft or joint, represents a problem that is of relevance in a plurality of applications. A particular application relates to the torque measurement during the movement of joints of robots. In a joint of a robot on which loads in various directions act, in order to accurately detect a torque in the rotation direction acting on the joint, usually some cancellation mechanism must be provided in order to exclude loads in directions other than the rotation direction from the measurement process. However, reliable exclusion of such loads is very difficult.

In the art it is known to compensate for loads in directions other than the rotation direction by Wheatstone circuitries and torque sensors comprising radially elastic torque transfer portions (see, for example, WO 2018/041948 A1). However, know torque sensor devices still suffer from a lack of accuracy of the torque measurements and relatively bulky configurations that, moreover, require additional members connected to the sensor bodies when it comes to sealing gear boxes with the sensor devices.

SUMMARY

A torque sensor device includes a circular body having an annular inner flange, an annular outer flange, and a circular intermediate portion between the annular inner flange and the annular outer flange. The annular inner flange is closer to a center of the circular body than the annular outer flange. The circular intermediate portion is a continuously solid portion.

BRIEF DESCRIPTION OF THE DRAWINGS

The invention will now be described by way of example with reference to the accompanying Figures, of which.

DETAILED DESCRIPTION OF THE EMBODIMENT(S)

Features and exemplary embodiments as well as advantages of the present disclosure will be explained in detail with respect to the drawings. It is understood that the present disclosure should not be construed as being limited by the description of the following embodiments. It should furthermore be understood that some or all of the features described in the following may also be combined in alternative ways.

Figure 1A:
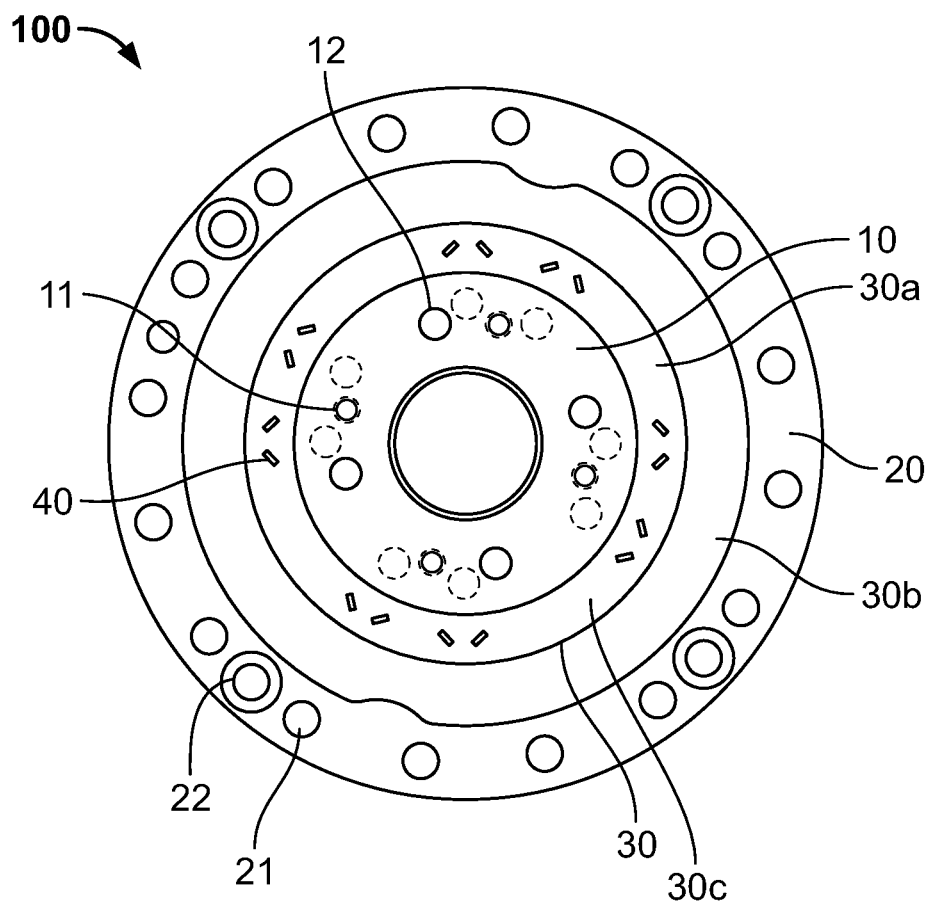
FIG. 1A is a plan view of a torque sensor device according to an embodiment.
Figure 1B:
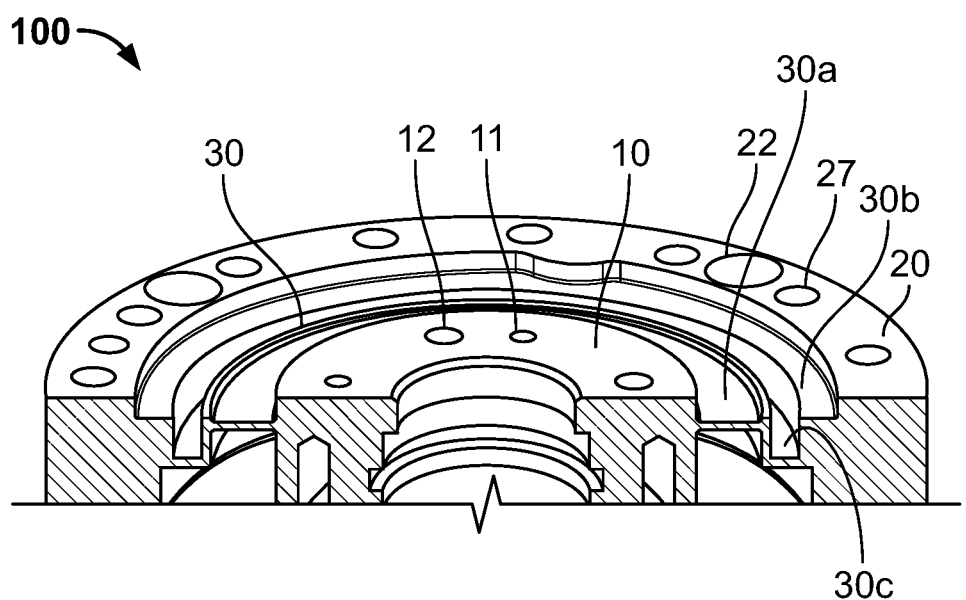
FIG. 1B is a sectional perspective view of the torque sensor device of FIG. 1A.

A torque sensor device 100 according to an embodiment is shown in FIGS. 1A and 1B. The torque sensor device 100 has an inner flange 10 and an outer flange 20. An intermediate portion 30 continuously extends radially from the inner flange 10 to the outer flange 20. The inner flange 10, the outer flange 20, and the intermediate portion 30 form a circular body, for example, a monolithic circular body. The circular body may consist of or comprise, for example, steel, aluminum or an aluminum alloy. Different parts of the circular body may be made of different materials when no monolithic circular body is provided. No openings extending through the entire material are formed in the intermediate portion 30. Thus, the intermediate portion 30 can serve as a seal, for example, for sealing a gear box.

The intermediate portion 30, in the embodiment shown in FIGS. 1A and 1B, has sub-portions 30a and 30b that, in an embodiment, are separated from each other by a separator 30c. The separator 30c may be a rim or it may be a circumferential groove 30c as illustrated in FIG. 1B. Such a circumferential groove 30c may serve as a radially elastic portion provided in order to suppress effects of radial loads (see also description below) in the process of measuring torque. In an embodiment, the circular intermediate portion 30 is a continuously solid portion (comprising no openings/cutouts) that at least partially may have a smaller thickness in an axial direction as the inner 10 and/or outer flange 20.

A plurality of pairwise measurement transducers 40 is formed on the intermediate portion 30, for example sub-portion 30a, as it is shown in the top view of the main surface of the torque sensor device 100 of FIG. 1A. The measurement transducers 40 are arranged symmetrically about an axis running through the center of the circular body perpendicular to the main surface (axial axis). The measurement transducers 40 can, in principle, be strain-sensitive transducers, in particular, strain gages. The measurement transducers 40 may comprise or consist of at least one of silicon gages, foil strain gages, and thin layer strain gages.

According to a particular embodiment, the plurality of measurement transducers 40 comprises at least four pairs of measurement transducers 40 wherein the two measurement transducers 40 of each of the pairs of measurement transducers 40 are located symmetrically to an axis extending through the center of the circular body in a direction parallel to the main surface of the circular body (radial axis). Such an arrangement may be advantageous with respect to the measurement accuracy by reliably suppressing influences of radial and axial loads as well as tilts.

Four pairs of measurement transducers 40 (for example, exactly four pairs of measurement transducers) may be provided wherein for each of the four pairs of measurement transducers 40 it holds that an axis extending through the center of the circular body in a direction parallel to the main surface of the circular body to which the two measurement transducers 40 of that pair of measurement transducers 40 are located symmetrically is spaced apart by 90° in a circumferential direction from an axis extending through the center of the circular body in a direction parallel to the main surface of the circular body to which two measurement transducers 40 of a neighboring pair of measurement transducers 40 are located symmetrically. The measurement accuracy may be enhanced by this arrangement due to reliably suppressing influences of radial and axial loads as well as tilts.

The strain gages may sense shear strain, particularly, oriented 45° inclined to the radial axis running through the center of the circular body in a direction parallel to the main surface of the circular body to which the strain gages of a pair of strain gages are symmetrically arranged. Pairs of measurement transducers 40 that are located opposite to each other define a measurement channel. The arrangement allows for eliminating or largely reducing the effects of tilts and radial and axial loads on the measurement of the torque and, thus, allows for an increased accuracy of the measurement results obtained by the torque sensor device 100, 100'.

In the inner flange 10, inner force application openings 11 and 12 of different sizes are formed and, in the outer flange 20, outer force application openings 21 and 22 of different sizes are formed, as shown in FIGS. 1A and 1B. The inner and outer force application openings 11, 12, 21 and 22 may be bores extending in an axial direction. The bores are open at least one side or the respective flange and may have any suitable geometrical shape, for example, a circular or polygonal shape cross-section. Torque to be measured is transferred, for example, by a rotating shaft under consideration and some static member, via connection members connected to the inner 11, 12 and outer force application openings 21, 22. Thereby, the torque applied between the inner 10 and outer flanges 20 can be measured.

Figure 2:
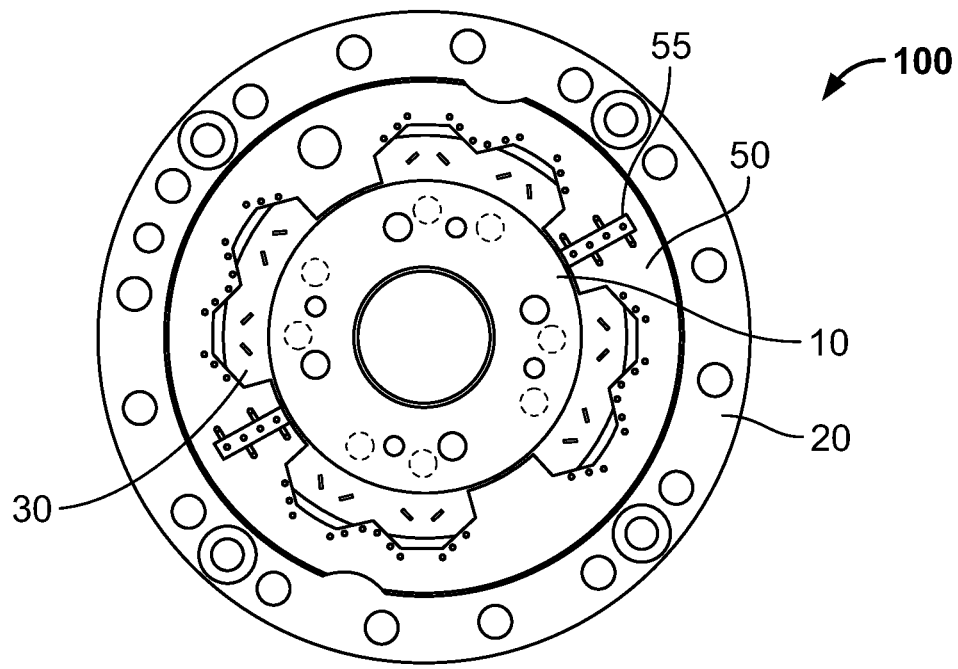
FIG. 2 is a plan view of the torque sensor device of FIG. 1A with a first printed circuit board.

FIG. 2 shows the torque sensor 100 of FIG. 1A or 1B wherein a first printed circuit board 50 comprising some circuitry devices as, for example, resistors and capacitors, and a connector 55 for connection to another printed circuit board 60 (see below) is provided over the intermediate portion 30. The measurement transducers 40 may be connected with an included measurement portion to the intermediate portion 30 and they may have free connecting portions for connection to the first printed circuit board 50 and, thus, the circuitry devices of the first printed circuit board 50. In an embodiment, the first printed circuit board 50 has Wheatstone bridge elements (resistors) for converting an applied torque to voltage output signals as it is known in the art. Depending on actual applications, a half or full Wheatstone bridge may be used. The first printed circuit board 50 may also comprise a DC or AC excitation source for the Wheatstone bridge circuitry.

Figure 3:
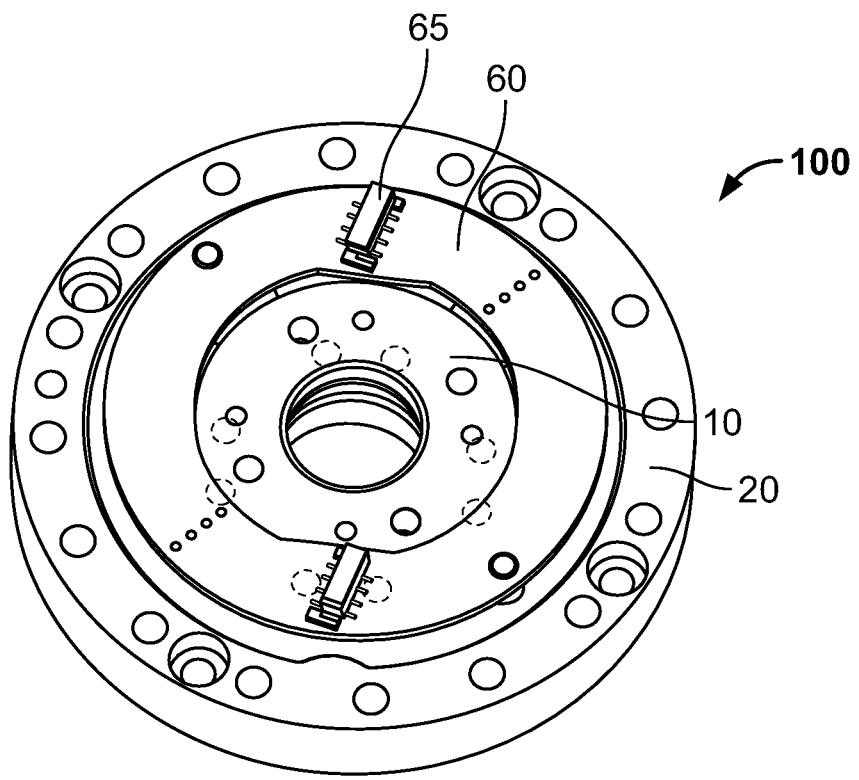
FIG. 3 is a perspective view of the torque sensor device of FIG. 2 with a second printed circuit board.

The first printed circuit board 50 may be covered by a second printed circuit board 60 as shown in FIG. 3. The second printed circuit board 60 protects the measurement transducers 40 and circuitry devices 55 against the environment. Particularly, the second printed circuit board 60 may have sensitive circuitry devices at the bottom (facing the first printed circuit boards 50) and a connector 65 for connection to the first printed circuit board 50. The second printed circuit board 60 is configured for signal conditioning, for example, for analogue-to-digital conversion of voltage output signals supplied by the circuitry devices of the first printed circuit board 50. Signal conditioning may also include amplification of voltage output signals supplied by the circuitry devices of the first printed circuit board 50.

As already mentioned, measurement transducers 40 can be arranged about an axial axis running through the center of the circular body in a direction perpendicular to the main surface of the circular body. For example, one or two pairs of measurement transducers 40 may be arranged spaced apart from one or two neighboring pairs of measurement transducers 40 by 90° in a circumferential direction. FIGS. 4A to 4D illustrate an embodiment wherein the measurement transducers 40 embodied as strain gages 40 are arranged pairwise symmetrically about an axial axis running through the center of the circular body in a direction perpendicular to the main surface of the circular body and wherein two measuring channels C are defined by opposing pairs of strain gages 40 that are spaced apart from each other by 90° (from one channel to the other channel) in a circumferential direction. Each measuring channel C runs through the center of particular pairs of strain gages 40 that are arranged opposite to each other.

A torque (indicated by the arrow in FIG. 4A) can be measured based on a differential strain $+\varepsilon$ and $-\varepsilon$ where $+\varepsilon$ is experienced by one strain gage of a pair of strain gages 40 and $-\varepsilon$ is experienced by the other strain gage of the pair of strain gages 40. The strain gages 40 are connected to a Wheatstone bridge circuitry formed on a printed circuit board 50. Due to the selected geometry of the arrangement of the strain gages 40 (and the corresponding architecture of the Wheatstone bridge circuitry) the voltage output signal supplied by the Wheatstone bridge circuitry caused by an applied torque (strain in the intermediate portion of the torque sensor device 100 on which the strain gages 40 are provided for sensing the strain) is proportional to $\Sigma\varepsilon=4\varepsilon+4\varepsilon=8\varepsilon$, i.e., a sufficiently high wanted voltage output signal can be provided.

Figure 4A:
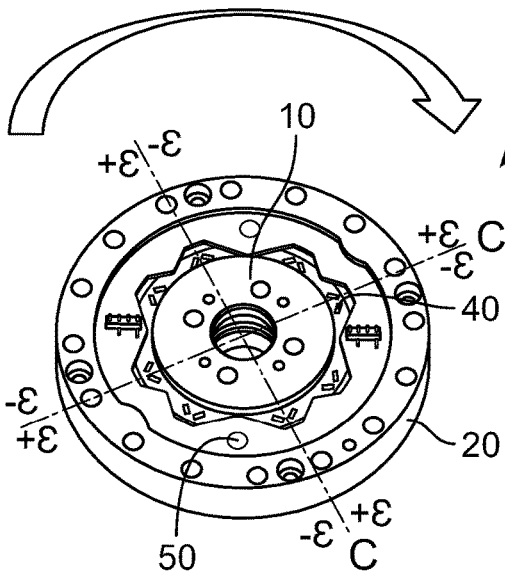
FIG. 4A is a schematic perspective view of a torque measurement using the torque sensor device.
Figure 4B:
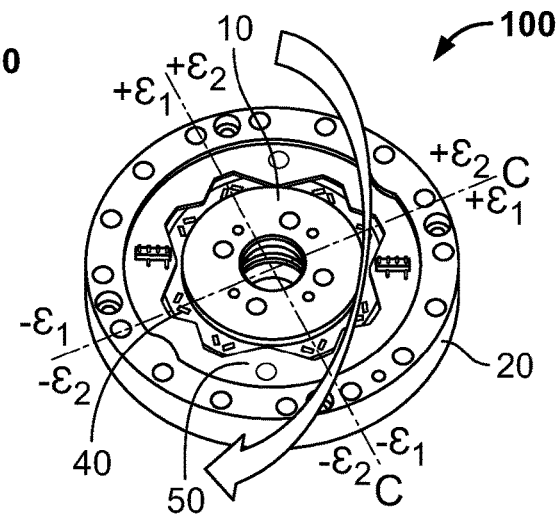
FIG. 4B is a schematic perspective view of a tilt load applied to the torque sensor device.
Figure 4C:
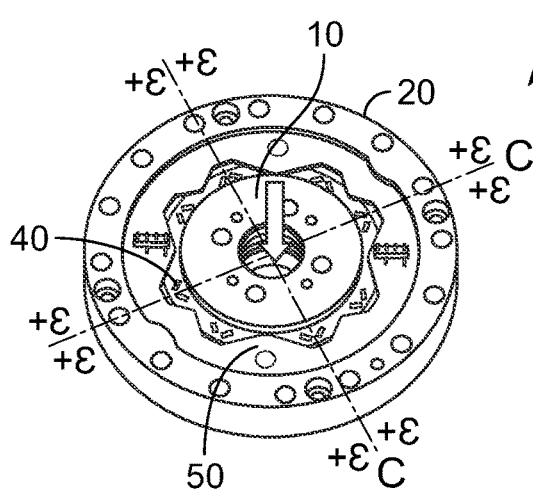
FIG. 4C is a schematic perspective view of an axial load applied to the torque sensor device.
Figure 4D:
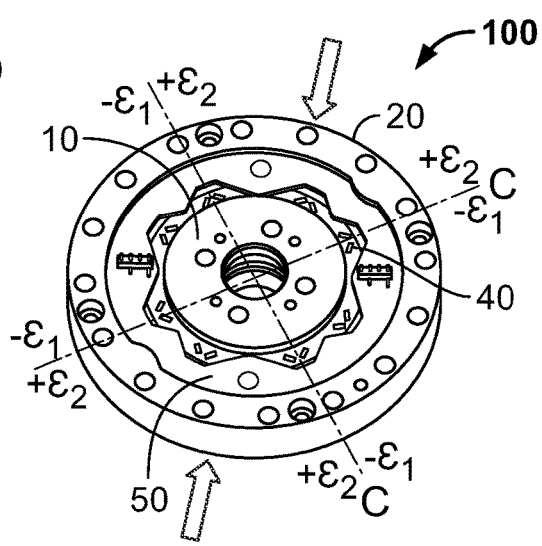
FIG. 4D is a schematic perspective view of a radial load applied to the torque sensor device.

On the other hand, perturbations due to tilt and axial and radial loads can be largely suppressed as illustrated in FIGS. 4B to 4D. The arrow in FIG. 4B indicates a tilt that might be applied to the torque sensor device. The tilt applied to the torque sensor device 100 results in differential strains $+\varepsilon 1$ and $+\varepsilon 2$, $+\varepsilon 2$ and $+\varepsilon 1$, $-\varepsilon 2$ and $-\varepsilon 1$, and $-\varepsilon 1$ and $-\varepsilon 2$, respectively, for the four pairs of strain gages 40 defining the measuring channels C. Accordingly, the strain caused by the tilt is compensated by the chosen geometry of the arrangement of the strain gages 40 (and the corresponding architecture of the Wheatstone bridge circuitry): $\Sigma\varepsilon=\varepsilon 1-\varepsilon 1+\varepsilon 2-\varepsilon 2=0$ such that it does not contribute to a voltage output signal being proportional to the applied torque as shown in FIG. 4A.

In order to achieve an accurate torque measurement, it is also necessary to compensate for any axial loads. Such kind of compensation can also be achieved by the selected geometry of the arrangement of the strain gages 40 (and the corresponding architecture of the Wheatstone bridge circuitry) as it is illustrated in FIG. 4C (the arrow indicates the applied axial load). The axial load (due to the axially symmetrically arrangement of the strain gages 40) results in strains $+\varepsilon$ at each of the strain gages 40 and, therefore, in a zero net effect: $\Sigma\varepsilon=4\varepsilon-4\varepsilon$. With respect to compensating for tilt and axial loads, it might be advantageous to locate the strain gages 40 at the same radial distance to the inner flange 10 and to the outer flange 20.

Compensation for radial loads by the selected geometry of the arrangement of the strain gages 40 (and the corresponding architecture of the Wheatstone bridge circuitry) is illustrated in FIG. 4D. The applied radial load is indicated by the arrows. The radial load results in differential strains $-\varepsilon 1$ and $+\varepsilon 2$, $+\varepsilon 2$ and $-\varepsilon 1$, $-\varepsilon 1$ and $+\varepsilon 2$, and $+\varepsilon 2$ and $-\varepsilon 1$, respectively, for the four pairs of strain gages 40 defining the two measuring channels C. Accordingly, the contribution to the voltage output signal of the Wheatstone bridge circuitry of the printed circuit board 50 is proportional to $\Sigma\varepsilon=-2\ \varepsilon 1+2\ \varepsilon 2+2\ \varepsilon 1-2\ \varepsilon 2=0$.

However, it has to be noted that exact compensation for radial loads as illustrated in FIG. 4D might not be achieved, if some radial loads are applied in a radial direction shifted with respect to the measuring channels C in the circumferential direction by 22.5°. In this case, some $\Sigma\varepsilon\neq 0$ may occur and negatively affect the accuracy of the measurement of the torque. In order to alleviate this problem, some radially elastic portion is provided in the intermediate portion 30 of the torque sensor device 100. In an embodiment, the radially elastic portion is realized by a groove 30c as illustrated in FIG. 1B. The radially elastic portion may be machined on the top or the bottom of the intermediate portion 30.

Figure 5:
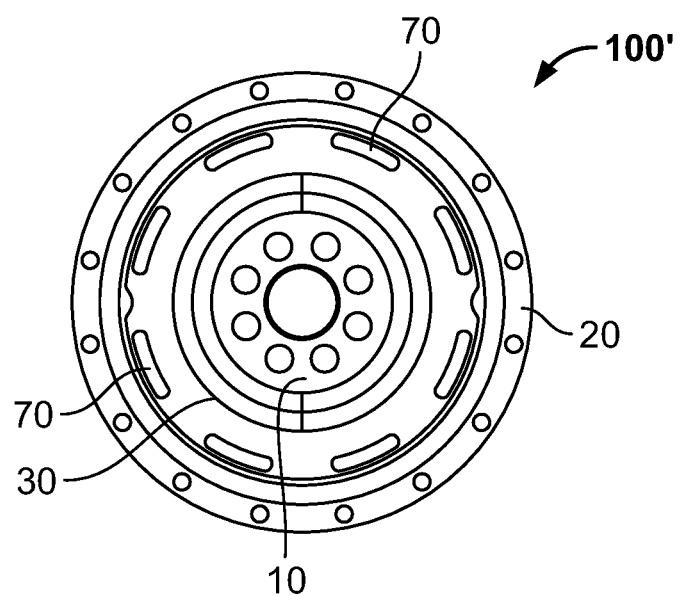
FIG. 5 is a plan view of a torque sensor device according to another embodiment.

According to another approach to address the problem of non-compensation of radial loads that are applied in a radial direction shifted with respect to the measuring channels C in the circumferential direction by 22.5°, tapered out portions 70 can be formed in the intermediate portion 30 of the torque sensor device 100' as shown in FIG. 5. The tapered out portions 70 may be machined on the top or the bottom of the intermediate portion 30. In the embodiment shown in FIG. 5, the tapered out portions 70 are arranged closer to the outer flange 20 than the inner flange 10 at the 22.5° positions. The tapered out portions 70 have larger dimensions in the circumferential direction than the radial direction. Experiments have proven that such an arrangement of the tapered out portions 70 significantly reduces any contributions of the corresponding radial loads to $\Sigma\varepsilon$ and, thus, the measurement result. It has to be noted that the tapered out portions 70 do not have to be punched through the intermediate portion 30 in order not to forfeit the advantageous sealing property of the torque sensor device 100'.

Furthermore, it is provided a robot, in particular, a collaborative robot, comprising a joint, wherein the joint comprises a gear box, and wherein the robot further comprises a torque sensor device 100, 100' according to one of the above-described embodiments. Particularly, the torque sensor device 100, 100' may be positioned to seal the gear box of the joint of the robot.

Additionally, it is provided a method of measuring a torque of a shaft positioned in a gear box, in particular, a gear box of a joint of a robot, the method comprising attaching the torque sensor device 100, 100' according to one of the above-described embodiments to the gear box such that the gear box is sealed and measuring the torque by the torque sensor device 100, 100' that is sealing the gear box.

In accordance with the above-described embodiments, an accurately operating torque sensor device 100, 100' can be provided in a compact design with a reduced height as compared to the art and at low costs. It can seal a gear box without the need for any additional sealing means and provide at least a two channel measurement. Particularly, all of the measurement transducers 40 involved can be formed on one and the same surface of the intermediate portion 30 of the torque sensor device 100, 100' described above.

The present invention provides a torque sensor device 100, 100' that allows for accurately measuring the torque of an object, for example, a rotating shaft or a robot joint wherein the measurement is not significantly affected by axial or radial loads or tilting moments. The torque sensor device 100, 100' is suitable for measuring the torque of a joint of a (collaborative) robot, for example. Torque control based on measurements made by the torque sensor device 100, 100' can be advantageously implemented in robots to facilitate robot-human interactions, for example.

What is claimed is:

1. A torque sensor device, comprising:
a circular body having an annular inner flange, an annular outer flange, and a circular intermediate portion between the annular inner flange and the annular outer flange in a radial direction of the circular body, the circular intermediate portion has an inner sub-portion, an outer sub-portion, and a circumferential groove separating the inner sub-portion and the outer sub-portion, the annular inner flange is closer to a center of the circular body than the annular outer flange, the circular intermediate portion is a continuously solid portion, the annular inner flange and the annular outer flange lie in a same plane that is parallel to a main surface of the torque sensor device; and
a plurality of measurement transducers formed in and/or on the inner sub-portion of the circular intermediate portion in a pairwise manner.

2. The torque sensor device of claim 1, wherein a plurality of inner force application openings are formed in the annular inner flange and a plurality of outer force application openings are formed in the annular outer flange.

3. The torque sensor device of claim 1, wherein the measurement transducers are positioned axially symmetrically to an axis extending through the center of the circular body in a direction perpendicular to the main surface of the circular body.

4. The torque sensor device of claim 3, wherein the measurement transducers include at least four pairs of measurement transducers.

5. The torque sensor device of claim 4, wherein each of the pairs of measurement transducers are located symmetrically to an axis extending through the center of the circular body in a direction parallel to the main surface of the circular body.

6. The torque sensor device of claim 5, wherein, for each of the pairs of measurement transducers, the axis extending through the center of the circular body in the direction parallel to the main surface to which the measurement transducers are located symmetrically is spaced apart by 90° in a circumferential direction from an axis extending through the center of the circular body in the direction parallel to the main surface to which the measurement transducers of a neighboring pair of measurement transducers are located symmetrically.

7. The torque sensor device of claim 1, wherein the circumferential groove is a radially elastic portion.

8. The torque sensor device of claim 1, wherein the measurement transducers comprise or consist of at least one of silicon gages, foil strain gages, and thin layer strain gages.

9. A robot, comprising:
a joint including a gear box and the torque sensor device of claim 1.

10. The robot of claim 9, wherein the torque sensor device is positioned to seal the gear box.

11. A method of measuring a torque of a shaft positioned in a gear box, comprising:
providing the torque sensor device of claim 1;
attaching the torque sensor device to the gear box to seal the gear box; and
measuring the torque with the torque sensor device.

12. A torque sensor device, comprising:
a circular body having an annular inner flange, an annular outer flange, and a circular intermediate portion between the annular inner flange and the annular outer flange in a radial direction of the circular body, the annular inner flange is closer to a center of the circular body than the annular outer flange, the circular intermediate portion is a continuously solid portion, the annular inner flange and the annular outer flange lie in a same plane that is parallel to a main surface of the torque sensor device; and a plurality of measurement transducers are formed in and/or on the circular intermediate portion in a pairwise manner, the measurement transducers are positioned axially symmetrically to an axis extending through the center of the circular body in a direction perpendicular to the main surface of the circular body, the measurement transducers include at least four pairs of measurement transducers, each of the pairs of measurement transducers are located symmetrically to an axis extending through the center of the circular body in a direction parallel to the main surface of the circular body, for each of the pairs of measurement transducers, the axis extending through the center of the circular body in the direction parallel to the main surface to which the measurement transducers are located symmetrically is spaced apart by 90° in a circumferential direction from an axis extending through the center of the circular body in the direction parallel to the main surface to which the measurement transducers of a neighboring pair of measurement transducers are located symmetrically.

13. A torque sensor device, comprising:

a circular body having an annular inner flange, an annular outer flange, and a circular intermediate portion between the annular inner flange and the annular outer flange in a radial direction of the circular body, the annular inner flange is closer to a center of the circular body than the annular outer flange, the circular intermediate portion is a continuously solid portion, the annular inner flange and the annular outer flange lie in a same plane that is parallel to a main surface of the torque sensor device, the circular intermediate portion has a plurality of tapered out portions not extending completely through the circular intermediate portion in a direction along an axis extending through the center of the circular body in a direction perpendicular to the main surface.

14. The torque sensor device of claim 13, wherein the tapered out portions are closer to the annular outer flange than the annular inner flange and have a longer extension in a circumferential direction than in the radial direction.

15. The torque sensor device of claim 14, wherein a center of each of the tapered out portions in the circumferential direction is spaced apart from an axis extending through the center of the circular body in a direction parallel to the main surface, with respect to which a pair of measurement transducers are located symmetrically, by 22.5° in the circumferential direction.

16. A torque sensor device, comprising:

a circular body having an annular inner flange, an annular outer flange, and a circular intermediate portion between the annular inner flange and the annular outer flange in a radial direction of the circular body, the annular inner flange is closer to a center of the circular body than the annular outer flange, the circular intermediate portion is a continuously solid portion, the annular inner flange and the annular outer flange lie in a same plane that is parallel to a main surface of the torque sensor device;

a plurality of measurement transducers are formed in and/or on the circular intermediate portion in a pairwise manner; and a first printed circuit board arranged over the circular intermediate portion.

17. The torque sensor device of claim 16, wherein the first printed circuit board has a Wheatstone bridge circuitry electrically connected to the measurement transducers.

18. The torque sensor device of claim 17, further comprising a second printed circuit board arranged above the first printed circuit board.

19. The torque sensor device of claim 18, wherein the second printed circuit board has a circuitry for signal conditioning including for analogue-to-digital conversion and/or amplification of signals provided by the Wheatstone bridge circuitry.

* * * * *